United States Patent Office 3,558,639
Patented Jan. 26, 1971

3,558,639
1-(2-HYDROXY-2-PHENYLETHYL)-2-[2-(TERTIARY AMINO)ETHYL]PIPERIDINES
Frederick K. Kirchner, Bethlehem, N.Y., assignor to Sterling Drug Inc., New York, N.Y., a corporation of Delaware
No Drawing. Continuation-in-part of application Ser. No. 550,618, May 17, 1966. This application Oct. 15, 1969, Ser. No. 866,744
Int. Cl. C07d 29/28
U.S. Cl. 260—294.7
12 Claims

ABSTRACT OF THE DISCLOSURE

1-[1-($R^1$)-2-($R^2$) - 2 - hydroxy-2-phenylethyl] - 2-[2-(B=N—)ethyl]piperidines which decrease spontaneous activity in mice are prepared by reduction of the carbonyl moiety of the corresponding 1-[1-($R^1$)-2-oxo-2-phenylethyl]-2-[2-(B=N—)ethyl]pipidines, or by reacting the latter with a Grignard reagent or organolithium reagent, $R^2$MgX or $R^2$Li. Alternatively, 2-[2-(B=N—)ethyl]piperidine is interacted with 1-($R^1$)-2-($R^2$)-2-phenyl-1,2-epoxyethane.

---

This application is a continuation-in-part of my prior, copending application Ser. No. 550,618, filed May 17, 1966, and now abandoned.

The invention described herein relates to new and useful chemical compounds and to intermediates in the preparation of the same.

The compounds of the instant invention are 1-[1-($R^1$)-2-($R^2$)-2-hydroxy-2-phenylethyl] - 2 - [2-(B=N—)ethyl] piperidines having in free base form, the structural formula:

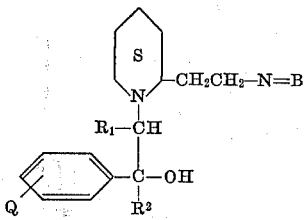

wherein $R^1$ is hydrogen or lower-alkyl; $R^2$ is hydrogen, lower-alkyl, Q-phenyl or Q-phenyl-lower-alkyl; —N=B is selected from the class consisting of di-lower-alkylamino, 1-piperidyl, 1-pyrrolidyl, 4-morpholinyl, (lower-alkyl) - (phenyl)amino or (lower-alkyl) - (phenyl-lower-alkyl)amino; and Q stands for hydrogen or from one to three substituents selected from the group consisting of lower-alkyl, lower-alkoxy, halogen and lower-alkylmercapto. The letter S within the hexagon indicates that the ring is saturated.

Pharmacological evaluation of the compounds of the invention, by the standard photo-cell activity cage procedure, has shown that these substances decrease spontaneous activity in mice and indicates usefulness for the compounds as central nervous system depressants, for example, as tranquillizers.

When representing lower-alkyl, the group $R^1$ includes straight- or branched-chain alkyl having from one to three carbon atoms, for example, methyl, ethyl, n-propyl, isopropyl and the like. Methyl and ethyl are the preferred lower-alkyl radicals represented by $R^1$. When $R^2$ represents lower-alkyl, there are include straight- or branched-chain alkyls having from one to six carbon atoms as illustrated by, but not limited to, methyl, ethyl, n-propyl, isopropyl, n-butyl, isobutyl, n-amyl, n-hexyl, and the like.

In the above general formula, the radical —N=B includes: di-lower-alkylamino; saturated N-heterocyclic groups, such as 1-piperidyl, 1-pyrrolidyl, 4-morpholinyl, and lower-alkylated derivatives thereof (for example, 2-methyl-1-piperidyl, 3-ethyl-1-pyrrolidyl, 3-methyl-4-morpholinyl and the like); (lower-alkyl)-(phenyl)amino; or (lower - alkyl) - (phenyl - lower - alkyl)amino. The term lower-alkyl includes alkyl radicals containing from one to six carbon atoms and in the di-lower-alkylamino radicals the lower-alkyl groups can be the same or different. Thus —N=B, when it represents a di-lower-alkylamino radical, includes such groups as dimethylamine, diethylamino, ethylmethylamino, dipropylamino, dibutylamino, dipentylamino and dihexylamino.

When —N=B represents a (lower-alkyl)-(phenyl) amino group there are included such groups as (methyl)-(phenyl)amino, $N(CH_3)(C_6H_5)$; (ethyl)-(phenyl)amino, $N(C_2H_5)(C_6H_5)$; (isopropyl)-(phenyl)amino, $$N(C_3H_7)(C_6H_5)$$

(butyl)-(phenyl)amino, $N(C_4H_9)(C_6H_5)$; (hexyl)-(phenyl)amino, $N(C_5H_{13})(C_6H_5)$; and the like. In the preferred types of (lower-alkyl)-(phenyl)amino groups, the lower-alkyl groups have from one to six carbon atoms. When representing (lower - alkyl) - (phenyl-lower-alkyl) amino, —N=B includes (methyl)-(benzyl)amino, $$N(CH_3)(C_6H_5CH_2)$$

(ethyl) - (phenylethyl)amino, $N(C_2H_5)(C_6H_5CH_2CH_2)$; (propyl)-(benzyl)amino, $N(C_3H_7)(C_6H_5CH_2)$; (butyl)-(phenylethyl)amino, $N(C_4H_9)(C_5H_5CH_2CH_2)$; and the like. In the preferred types of (lower-alkyl)-phenyl-lower-alkyl)amino groups, the lower-alkyl groups have from one to six carbon atoms and the alkylene radicals of the phenyl-lower-alkyl groups have from one to four carbon atoms.

The term "phenyl-lower-alkyl" as used herein means a monovalent radical consisting of the phenyl nucleus bonded to the rest of the molecule through a divalent lower-alkylene radical of from one to four carbon atoms as exemplified by, but not limited to, methylene, 1,1-ethylene, 1,2-ethylene, 1,3-propylene, 1,2-propylene, 1,4-butylene, and the like. Thus, solely for illustration and without limitation, examples of phenyl-lower-alkyl are benzyl, 1-phenylethyl, 2-phenylethyl, 3-phenylpropyl and the like.

The symbol Q in the above structural formula, when it is other than hydrogen, represents from one to three substituents selected from lower-alkyl, lower-alkoxy, halogen and lower-alkylmercapto. The substituents when more than one can be the same or different and in any of the possible orientations in the benezene ring. The lower-alkyl groups or lower-alkyl moieties of lower-alkoxy and lower-alkylmercapto can have from one to six carbon atoms and can be straight or branched, although primary or secondary alkyl groups are preferred. The halogen substituents can be any of the four halogens, fluorine, chlorine, bromine or iodine.

The compounds of the present invention are prepared by various methods. One of these methods comprises the reaction of 1 - [1 - ($R^1$) - 2 - oxo-2-phenylethyl]-2-[2-(B=N—)ethyl]piperidine with a Grignard reagent or an organolithium compound. Hydrolysis of the magnesium or lithium complex gives the 1-[1-($R^1$)-2-($R^2$)-2-hydroxy-2-phenylethyl]-2-[2-(B=N—)ethyl]piperidine wherein $R^2$ is lower-alkyl, phenyl or phenyl-lower-alkyl and $R^1$ and B=N— have the meanings given above. If it is desired to prepare a final product of the invention in which $R^2$ is hydrogen, the 1 - [1-($R^1$) - 2 - oxo-2-phenylethyl]-2-[2-(B=N—)ethyl]piperidine is reacted with lithium aluminum hydride and the complex hydrolyzed to obtain the 1-[1-($R^1$) - 2 - hydroxy-2-phenylethyl] - 2 - [2-(B=N—) ethyl]piperidine wherein $R^1$ and B=N— have the meanings given above.

The intermediate, 1 - [1-($R^1$)-2-oxo-2-phenylethyl]-2-[2-(B=N—)ethyl]piperidine, is conveniently obtained by the reaction of 2-[2-(B=N—)ethyl]piperidine with 2-halo-2-($R^1$)-acetophenone, in which the benzene ring can be substituted as hereinbefore described and wherein the symbols $R^1$ and B=N— have the meanings given above.

The starting 2-[2-(B=N—)ethyl]piperidines are a known class of compounds, readily prepared by methods known in the art, for example, by addition of B=NH to 2-vinylpyridine followed by hydrogenation of the pyridine ring to a piperidine ring.

The starting 2-halo-2-($R^1$)-acetophenones are a known class of compounds readily prepared by methods known in the art, for example, by chlorination or bromination of 2-(R')-acetophenone in acetic acid solution.

Alternatively, the final products of this invention can be prepared by the reaction of 2-[2-(B=N—)ethyl]piperidine with 1 - ($R^1$) - 2 - ($R^2$) - 2 - phenyl-1,2-epoxyethane wherein the meanings of $R^1$, $R^2$ and B=N— are those given hereinbefore. The reaction is preferably carried out in a refluxing solution of a lower-alkanol comprised of from one to three carbon atoms and in the presence of a small amount of water or phenol.

The starting 1-($R^1$)-2-($R^2$)-2-phenyl-1,2-epoxyethanes are a known class of compounds readily prepared by methods known in the art, for example, by reacting a 2-halo - 2 - ($R^1$) - acetophenone with a Grignard reagent $R^2MgX$ to give a 2-halo-2-($R^1$)-1-($R^2$)-1-phenylethanol, followed by dehydrohalogenation of the latter with a strong base.

The novel compounds of the instant invention are the bases represented by the general formula given hereinabove and the acid-addition salts of said bases. The compounds of the invention in free base form are converted to the acid-addition salt formed by interaction of the base with an acid. In like manner, the free bases can be regenerated from the acid-addition salt formed in the conventional manner, that is, by treating the salts with strong aqueous bases, for example, alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that the general formula shown above not only represents the structural configurations of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of the type described hereinabove. This inherent pharmacodynamic activity can be used for pharmaceutical purposes by employing either the free bases or the acid-addition salts formed with pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of my new bases are useful and valuable compounds, regardless of considerations of solubility, toxicity, physical form, and the like.

The novel feature of the compounds of the invention, therefore, resides in the concept of the bases and cationic forms of the new 1-[1-($R^1$)-2-($R^2$)-2-hydroxy-2-phenylethyl]-2-[2-(B=N—)ethyl]piperidines, and not in any particular acid anion associated with the salt forms of the compounds, rather, the acid anions, which can be associated in the salt forms, are in themselves neither novel nor critical and therefore can be any acid anion or acid-like substance capable of salt formation with bases. In fact, in aqueous solutions the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds can be prepared for use by dissolving, under sterile conditions, a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, oil solution or oil-water emulsions, or other conventional pharmaceutical excipients.

The chemical structures of the compounds of the invention are established by their mode of synthesis and are corroborated by the correspondence between calculated values for the elements and values found by chemical analysis and by appropriate spectral properties.

The following examples will further illustrate specific embodiments of the invention.

Preparation of 1-[1-($R^1$)-2-oxo-2-phenylethyl]-2-[2-(B=N—)ethyl]piperidines 1-(2-oxo-2-phenylethyl)-2-[2-(1-piperidyl)ethyl] piperidine A solution of 39.8 g. (0.2 mole) of 2-chloroacetophenone in 100 ml. of dry toluene was added to a solution of 39.3 g. (0.2 mole) of 2-[2-(1-piperidyl)ethyl] piperidine and 20.6 g. (0.2 mole) of triethylamine in 100 ml. of dry toluene. The mixture was stirred at reflux for sixteen hours and then filtered. The filtrate was extracted with an excess of 10% aqueous hydrochloric acid. The acid extract was chilled, made stronly alkaline by the addition of 35% aqueous hydroxide and the separated oil drawn off. The aqueous layer was extracted with methylene dichloride and the combined oil layer and extract dried ($Na_2SO_4$), concentrated, and distilled giving 25.9 g. of 1 - (2 - oxo-2-phenylethyl)-2-[2-(1-piperidyl)ethyl]piperidine, B.P. 156–158° C. (0.08 mm.); $n_D^{25}$ 1.5403.

1-[2-oxo-2-(4-bromophenyl)ethyl]-2-[2-(1-piperidyl)ethyl]piperidine

Following the procedure above, but substituting 46.5 g. (0.167 mole) of 2,4′dibromoacetophenone for phenacyl chloride and isolating the product as its hydrochloric acid-addition salt, there was obtained 1-[2-oxo-2-(4-bromophenyl)ethyl] - 2-[2-(1-piperidyl)ethyl]piperidine dihydrochloride as a white, crystalline solid, M.P. 251.2–252.0° C. (dec.) (cor.).

Proceeding in the manner described in Example 1, using the appropriate starting materials, the following 1-[1-(R¹)-2-oxo-2-phenylethyl]-2-[2-(B=N—)ethyl]piperidines can be obtained:

1 - [1 - methyl-2-oxo-2-(4-n-butylphenyl)ethyl]-2-(2-diethylaminoethyl)piperidine, from 2-chloro-1-methyl-4′-(n-butyl)-acetophenone and 2 - (2 - diethylaminoethyl)piperidine;

1 - [1 - ethyl-2-oxo-2-(4-methoxyphenyl)ethyl]-2-[2-(3 - ethyl - 1-pyrrolidyl)ethyl]piperidine, from 2-chloro-1 - ethyl - 4′-methoxyacetophenone and 2-[2-(3-ethyl-1-pyrrolidyl)ethyl]-piperidine;

1 - (1 - n-propyl-2-oxo-2-phenylethyl)-2-[2-(N-ethyl-N-phenylamino)ethyl]piperidine, from 2 - chloro - 1 - (n-propyl)acetophenone and 2-[2-(N-ethyl-N-phenylamino)ethyl]piperidine;

1 - [ 1-n-propyl-2-oxo-2-(2,4,6-trimethylphenyl)ethyl]-2 - [2 - (N-n-propyl-N-benzylamino)ethyl]piperidine, from 2 - chloro - 1-(n-propyl)-2′,4′,6′-trimethylacetophenone and 2 - [N-(n-propyl)-N-benzylamino)ethyl]piperidine;

1 - [2 - oxo - 2-(4-chlorophenyl)ethyl]-2-[2-(4-morpholinyl)-ethyl]piperidine, from 2,4′ - dichloroacetophenone and 2-[2-(4-morpholinyl)ethyl]piperidine;

1 - [2-oxo-2-(4-fluorophenyl)ethyl]-2-[2-(1-piperidyl)-ethyl]piperidine, from 2-chloro-4′-fluoroacetophenone and 2-[2-(1-piperidyl)ethyl]piperidine;

1 - [2 - oxo-2-(4-iodophenyl)ethyl]-2-[2-(1-piperidyl)-ethyl]piperidine, from 2-chloro-4′-iodoacetophenone and 2-[2-(1-piperidyl)ethyl]piperidine; and 1 - [2 - oxo - 2 - (4-methylthiophenyl)ethyl]-2-[2-(1-piperidyl)ethyl]piperidine, from 2 - chloro-4′-methylthioacetophenone and 2-[2-(1-piperidyl)ethyl]piperidine.

EXAMPLE 1

1-(2-phenyl-2-hydroxy-2-phenylethyl)-2-[2-(1-piperidyl)ethyl]-piperidine

A solution of 9.4 g. (0.03 mole) of 1-(2-oxo-2-phenylethyl)-2-[2-(1-piperidyl)ethyl]piperidine in 50 ml. of dry diethyl ether was added under an atmosphere of nitrogen during twenty minutes to a solution of phenyllithium prepared by reacting 0.83 g. (0.12 mole) of lthium metal with 9.43 g. (0.06 mole) of bromobenzene in 100 ml. of dry diethyl ether. The reaction solution was refluxed for ninety minutes. The lithium complex was decomposed by the cautious addition of 50 ml. of water. The ether layer was dried (Na₂SO₄), concentrated, and distilled to obtain a viscous liquid, B.P. 180° C. (0.08 mm.). The product solidified and after recrystallization from a small amount of boiling ethyl alcohol, melted at 86–87° C.

By replacing the 1-(2-oxo-2-phenylethyl)-2-[2-(1- piperidyl)ethyl]piperidine in the foregoing preparation by a molar equivalent amount of 1-[1-methyl-2-oxo-2-(4-n-butylphenyl)ethyl]-2-(2-diethylaminoethyl)piperidine, 1-[1-ethyl-2-oxo-2-(4-methoxyphenyl)ethyl]-2-[2-(3-ethyl-1-pyrrolidyl(ethyl]-piperidine, 1-(1-n-propyl-2-oxo-2-phenylethyl)-2-[2-(N-ethyl-N-phenylamino)ethyl]piperidine, 1-[1-n-propyl-2-oxo-2-(2,4,6-trimethylphenyl)ethyl]-2-[2-(N-n-propyl-N-benzylamino)ethyl]-piperidine, 1-[2-oxo-2-(4-chlorophenyl)ethyl]-2-[2-(4-morpholinyl)ethyl]piperidine, 1-[2-oxo-2-(4-fluorophenyl)ethyl]-2-[2-(1-piperidyl)ethyl]piperidine, 1-[2-oxo-2-(4-iodophenyl)-ethyl]-2-[2-(1-piperidyl)ethyl]piperidine or 1-[2-oxo-2-(4-methylthiophenyl)ethyl]-2-[2-(1-piperidyl)ethyl]piperidine there can be obtained, respectively, 1-[1-methyl-2-(4-n-butylphenyl)-2-hydroxy-2-phenylethyl]-2-(2-diethylaminoethyl)piperidine;

1-[1-ethyl-2-(4-methoxyphenyl)-2-hydroxy-2-phenylethyl]-2-[2-(3-ethyl-1-pyrrolidyl)ethyl]piperidine;

1-[1-(n-propyl)-2,2-diphenyl-2-hydroxyethyl]-2-[2-(N-ethyl-N-phenylamino)ethyl]-piperidine;

1-[1-(n-propyl)-2-(2,4,6-trimethylphenyl)-2-hydroxy-2-phenylethyl]-2-[2-(N-n-propyl-N-benzylamino)ethyl]-piperidine;

1-[2-(4-chlorophenyl)-2-hydroxy-2-phenylethyl]-2-[2-(4-morpholinyl)ethyl]piperidine;

1-[2-(4-fluorophenyl)-2-hydroxy-2-phenylethyl]-2-[2-(1-piperidyl)ethyl]piperidine;

1-[2-(4-iodophenyl)-2-hydroxy-2-phenylethyl]-2-[2-(1-piperidyl)-ethyl]piperidine; or 1-[2-(4-methylthiophenyl)-2-hydroxy-2-phenylethyl]-2-[2-(1-piperidyl)ethyl]piperidine.

By replacing the phenyllithium in the foregoing preparation by a molar equivalent amount of 3-methoxyphenyllithium, methylmagnesium bromide, benzylamgnesium bromide, or p-chlorobenzylmagnesium bromide, there can be prepared, respectively, 1-[2-(3-methoxyphenyl)-2-hydroxy-2-phenylethyl]-2-[2-(1-piperidyl)ethyl]piperidine;

1-(2-phenyl-2-hydroxypropyl)-2-[2-(1-piperidyl)ethyl]piperidine;

1-(2-hydroxy-2,3-diphenylpropyl)-2-[2-(1-piperidyl)ethyl]piperidine; or

1-[2-hydroxy-2-phenyl-3-(4-chlorophenyl)propyl]-2-[2-(1-piperidyl)ethyl]piperidine.

By reaction of the appropriate 1-[1-(R¹)-2-oxo-2-phenylethyl]-2-[2-(B=N—)ethyl]piperidines with a suitable reducing agent, for example, lithium aluminum hydride, sodium borohydride and the like, there are obtained, for example:

1-(2-hydroxy-2-phenylethyl)-2-[2-(1-piperidyl)ethyl]-piperidine,

1-[1-methyl-2-hydroxy-2-(4-bromophenyl)ethyl]-2-(2-diethylaminoethyl)piperidine, 1-[1-ethyl-2-hydroxy-2-(4-methoxyphenyl)ethyl]-2-[2-(3-ethyl-1-pyrrolidyl)ethyl]piperidine, 1-(1-n-propyl-2-hydroxy-2-phenylethyl)-2-[2-(N-ethyl-N-phenylamino)ethyl]piperidine, 1-[1-n-propyl-2-hydroxy-2-(2,4,6-trimethylphenyl)ethyl]-2-[2-(N-n-propyl-N-benzylamino)ethyl]piperidine, 1-[2-hydroxy-2-(4-chlorophenyl)ethyl]-2-[2-(4-morpholinyl)ethyl]piperidine.

EXAMPLE 2

1-[2-(4-chlorophenyl)-2-hydroxy-2-(4-chlorophenyl)ethyl]-2-[2-(1-piperidyl)ethyl]piperidine A solution comprised of 13.73 g. (0.07 mole) of 2-[2-(1-piperidyl)ethyl]piperidine, 9.07 g. (0.034 mole) of 1,1-bis(4-chlorophenyl)-1,2-epoxyethane and eight drops of water was heated at 95–100° C. for twenty hours. After cooling, the reaction mixture was poured into 150 ml. of cold water and the oil that separated was extracted with ether. The ether solution was dried (Na₂SO₄), concentrated, and distilled to obtain 1-[2-(4-chlorophenyl)-2-hydroxy - 2-(4-chlorophenyl)ethyl]-2-[2-(1-piperidyl)ethyl]piperidine, a viscous amber-colored liquid, B.P. 200° C. (3μ). The dihydrochloride salt, prepared by treatment of the free base with an ethyl alcohol solution of anhydrous hydrochloric acid, melted over a range of from 178.8 to 201.8° C. (cor.).

EXAMPLE 3

1-[2-(4-chlorophenyl)-2-hydroxy-2-phenylethyl]- 2-[2-(1-piperidyl)ethyl]piperidine Following the procedure described in Example 2 hereinabove, but substituting 1-(4-chlorophenyl)-1-phenyl-1, 2-epoxyethane in molar equivalent amount for 1,1-bis(4-chlorophenyl)-1,2-epoxyethane used in that example, there was obtained 1-[2-(4-chlorophenyl)-2-hydroxy-phenylethyl]-2-[2-(1-piperidyl)ethyl]piperidine, B.P. 178–180° C. ($4.3\mu$). The bis-tartrate, salt, prepared by treating the base with a methanol solution of di-tartaric acid, melted at 115.8–123.0° C. (dec.) (cor.).

EXAMPLE 4

1-(2-ethyl-2-hydroxy-2-phenylethyl)-2-[2-(1-piperidyl)ethyl]piperidine

When the above-described procedure of Example 2 was followed, substituting 2-phenyl-1,2-epoxybutane for 1,1-bis(4-chlorophenyl)-1,2-epoxyethane, 1-(2-ethyl-2-hydroxy - 2 - penylethyl)-2-[2-(1-piperidyl)ethyl]piperidine was obtained as a cream colored solid, M.P. 50.8–58.0° C. (cor.).

EXAMPLE 5

1-(2-n-butyl-2-hydroxy-2-phenylethyl)-2-[2- 1-piperidyl)ethyl]piperidine

Using the procedure described in Example 2 hereinabove, but substituting 2-phenyl-1,2-epoxyhexane for 1,1-bis(4-chlorophenyl)-1,2 - epoxyethane, 1-(2-n-butyl-2-hydroxy-2-phenylethyl)-2-[2-(1-piperidyl)ethyl] piperidine was obtained as a yellow, viscous liquid, B.P. 160–163° C. ($2\mu$). By treatment with an ethyl alcohol solution of d-tartaric acid, the base was converted to the corresponding bis-tartrate salt, a white solid, M.P. 95.0–95.8° C. (dec.) (cor.).

EXAMPLE 6

1-[2-(4-tolyl)-2-hydroxy-2-phenylethyl]-2-[2- (1-piperidyl)ethyl]piperidine

By substituting 1-phenyl-1(4-tolyl)-1,2-epoxyethane in molar equivalent quantity for 1,1-bis(4-chlorophenyl)-1, 2-epoxyethane in the procedure described in Example 2 hereinabove, there was obtained 1-[2-(4-tolyl)-2-hydroxy-2-phenylethyl]-2-[2 - (1-piperidyl)ethyl]piperidine, B.P. 200° C. ($4.5\mu$). The base was treated with a methanol solution of d-tartaric acid to give the corresponding bis-tartrate salt, M.P. 117.2–122.8° C. (cor.).

EXAMPLE 7

1-[2-(2,4-dimethylphenyl)-2-hydroxy-2-phenylethyl]-2-[2-(1-piperidyl)ethyl]piperidine The reaction of 2-[2-(1-piperidyl)ethyl]piperidine with 1-(2,4-dimethylphenyl)-1 - phenyl-1,2-epoxyethane, following the procedure described in Example 2 hereinabove, gave a pale yellow, viscous liquid, B.P. 190–192° C. ($1\mu$). The base, when treated with a methanol solution if d-tartaric acid, gave 1-[2-(2,4-dimethylphenyl)-2-hydroxy-2-phenylethyl]-2-[2 - (1-piperidyl)ethyl]piperidine bis-tartrate, M.P. 112.2–122.0° C. (cor.).

EXAMPLE 8

1-(2-benzyl-2-hydroxy-2-phenylethyl)-2-[2-(1-piperidyl)ethyl]piperidine

Following the procedure described in Example 2 hereinabove, the reaction of 2-[2-(1-piperidyl)ethyl]piperidine with 2,3-diphenyl-1,2-epoxypropane gave a viscous, yellow liquid, B.P. 164–166° C. ($2\mu$). Upon treatment of the base with a methanol solution of d-tartaric acid, there was obtained 1-(2-benzyl-2-hydroxy-2-phenylethyl)- 2-[2-(1 - piperidyl)ethyl]piperidine bis - tartrate, M.P. 189.4–190.2° C. (dec.) (cor.).

Proceeding in the manner described in Example 2, hereinabove, in reacting the appropriate 2-[2-(B=N—) ethyl]piperidine with the appropriate 1-($R^1$)-2-($R^2$)-2-phenyl-1,2-epoxyethane, there can be obtained:

1,[2-n-propyl-2-hydroxy-2 - (4-chlorophenyl)ethyl]-2- (2-diethylaminoethyl)piperidine, from 1-(n-propyl)-2-(4-chlorophenyl)-2-phenyl-1,2-epoxyethane and 2-(2-diethylaminoethyl)piperidine;

1-[1-methyl-2-phenyl - 2-hydroxy - 2-(4-methoxyphenyl)ethyl]-2-[2-(N-ethyl - N - methylamino)ethyl]piperidine, from 1-methyl-2-(4-methoxyphenyl)-2-phenyl-1,2-epoxyethane and 2-[2-(N-ethyl-N-methylamino)ethyl] piperidine;

1-[1-ethyl-2-(4-methylmercaptophenyl) - 2 - hydroxy-2-phenylethyl]-2-[2-(2-methyl - 1-piperidyl)ethyl]piperidine, from 1-ethyl-2-(4-methylmercaptophenyl)-2-phenyl-1-2-epoxyethane and 2-[2-(2-methyl-1-piperidyl)ethyl] piperidine;

1-(1-n-propyl-2-benzyl - 2 - hydroxy-2-phenylethyl)-2- (2 - dihexylaminoethyl)piperidine, from 1-(n-propyl)-2-benzyl-2-phenyl-1,2-epoxyethane and 2-(2-dihexylaminoethyl)piperidine;

1-(2-ethyl-2-hydroxy-2-phenylethyl) - 2-[2-(N-methyl-N-phenylamino)ethyl]piperidine, from 2-ethyl-2-phenyl-1,2-epoxyethane and 2-[2-(N-methyl-N-phenylamino) ethyl]piperidine;

1-[2-(4-tolyl)-2 - hydroxy - 2-phenylethyl]-2-[2-(N-ethyl-N-benzylamino)ethyl]piperidine, from 2-(4-tolyl)- 2-phenyl-1,2-epoxyethane and 2-[2-(N-ethyl-N-benzylamino)ethyl]piperidine;

1-[1,2-diethyl-2-hydroxy-2 - (4-methoxyphenyl)ethyl]- 2-[2-(1-pyrrolidyl)ethyl]piperidine, from 1,2 - diethyl-2-(4-methoxyphenyl)-1,2-epoxyethane and 2-[2-(1-pyrrolidyl)ethyl]piperidine;

1-[2-(4 - chlorophenyl)-2-hydroxy-2-(4-chlorophenyl)-ethyl]-2-[2-(3-ethyl-1 - pyrrolidyl)ethyl]piperidine, from 2,2-bis(4-chlorophenyl)-1,2-epoxyethane and 2-[2-(3-ethyl-1-pyrrolidyl)ethyl]piperidine;

1-[1-methyl-2-(2,5-dimethoxyphenyl) - 2 - hydroxy-2-phenylethyl]-2-[2-(4-morpholinyl)ethyl]piperidine, from 1-methyl-2-phenyl-2-(2,5 - dimethoxyphenyl)-1,2-epoxyethane and 2-[2-(4-morpholinyl)ethyl]piperidine;

1-(2-n-butyl-2-hydroxy-2-phenylethyl) - 2-[2-(3-methyl-4-morpholinyl)ethyl]piperidine, from 2 - phenyl-2-(n-butyl)-1,2-epoxyethane and 2-[2-(3-methyl-4-morpholinyl)ethyl]piperidine;

1-[2-(3-methoxy-4-chlorophenyl - 2-hydroxy-2-phenylethyl]-2-[2-(1 - piperidyl)ethyl]piperidine, from 2-(3-methoxy-4-chlorophenyl)-2-phenyl - 1,2-epoxyethane and 2-[2-(1-piperidyl)ethyl]piperidine; and 1-[2-(3,5-dimethoxybenzyl) - 2-hydroxy - 2 - phenylethyl]-2-[2-(1-piperidyl)ethyl]piperidine, from 2-(3,5-dimethoxybenzyl)-2-phenyl-1,2-diepoxyethane and 2-[2-(1-piperidyl)ethyl]piperidine.

My new compounds can exist in stereochemically isomeric forms, that is, optical isomers and geometric isomers. If desired, the isolation or the production of a particular stereochemical form can be accomplished by application of the general principles known in the prior art.

The psychomotor depressant activities of the 1-[1-($R^1$)- 2 - ($R^2$) - 2 - hydroxy - 2 - phenylethyl]-2-[2-(B=N—)- ethyl]piperdines of the invention were determined in standard activity cages using the method of Dews, Brit. J. Pharmacol. 8, 46 (1953) in which mice, medicated with the test compound, are placed in wire mesh cage equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activities, respectively. The dose at which such reduction in motor activity is observed is recorded as the active dose. Alternatively, the $ED_{50}$, the effective dose in 50% of the animals, is determined from a dose-response curve.

Instead of determining the motor activity of the test animals using a digital counter activated by a photoelectric cell, there can also be used a counting apparatus such as described by Bonta et al., Arch. int. pharmacodyn. 129, 381-394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquillizer activity.

The compounds of the invention, when administered orally in a daily dose to mice in the above-described psychomotor activity test, were found to be active in the range of from 30 to 300 mg./kg. of body weight.

I claim:
1. 1 - [1 - ($R^1$) - 2 - ($R^2$) - 2 - hydroxy-2-(Q-phenyl)-ethyl] - 2 - [2 - (B=N—)ethyl]piperdine, wherein $R^1$ is hydrogen or lower-alkyl; $R^2$ is hydrogen, lower-alkyl, Q-phenyl, or Q-phenyl-lower-alkyl; B=N— is di-lower-alkylamino, 1 - piperidyl, 1 - pyrrolidyl, 4 - morpholinyl, (lower-alkyl)-(phenyl-lower-alkyl)amino; and Q stands for hydrogen or from one to three substituents selected from the group consisting of lower-alkyl, lower-alkoxy, halogen and lower-alkylmercapto.

2. 1 - [2 - (lower-alkyl) - 2 - hydroxy - 2 - phenyl-ethyl] - 2 - [2 - (B=N—)ethyl]piperidine, according to claim 1, wherein $R^1$ is hydrogen, $R^2$ is lower-alkyl, and Q is hydrogen.

3. 1 - [2 - (lower - alkyl) - 2 - hydroxy - 2 - phenyl-ethyl] - 2 - [2 - (1-piperidyl)ethyl]piperidine, according to claim 1, wherein $R^1$ is hydrogen, $R^2$ is lower-alkyl, B=N— is 1-piperidyl, and Q is hydrogen.

4. 1 - (2 - ethyl - 2 - hydroxy - 2 - phenylethyl) - 2 - [2 - (- 1 - piperidyl)ethyl]piperidine, according to claim 1, wherein $R^1$ is hydrogen, $R^2$ is ethyl, B=N— is 1-piperidyl, and Q is hydrogen.

5. 1 - (2 - n - butyl - 2 - hydroxy - 2 - phenylethyl) - 2 - [2 - (1 - piperidyl)ethyl]piperidine, according to claim 1, wherein $R^1$ is hydrogen, $R^2$ is n-butyl, B=N— is 1-piperidyl, and Q is hydrogen.

6. 1 - (2 - phenyl - 2 - hydroxy - 2 - phenylethyl) - 2 - [2 - (B=N—)ethyl]piperidine, according to claim 1, wherein $R^1$ is hydrogen, $R^2$ is phenyl, and Q is hydrogen.

7. 1 - (2 - phenyl - 2 - hydroxy - 2 - phenylethyl) - 2 - [2-(1-piperidyl)ethyl]piperidine, accoding to claim 1, wherein $R^1$ is hydrogen, $R^2$ is phenyl, B=N—is 1-piperidyl, and Q is hydrogen.

8. 1 - [2 - (phenyl - lower - alkyl) - 2 - hydroxy - 2 - phenylethyl] - 2 - [2 - (B=N—)ethyl]piperdine, according to claim 1, wherein $R^1$ is hydrogen, $R^2$ is phenyl-lower-alkyl, and Q is hydrogen.

9. 1 - [2 - (phenyl - lower - alkyl) - 2 - hydroxy - 2 - phenylethyl] - 2 - [2 - (1 - piperidyl)ethyl]piperidine, according to claim 1, wherein $R^1$ is hydrogen, $R^2$ is phenyl lower-alkyl, B=N— is 1-piperidyl, and Q is hydrogen.

10. 1 - (2 - benzyl - 2 - hydroxy - 2 - phenylethyl) - 2 - [2 - (1 - piperidyl)ethyl]piperidine, according to claim 1, wherein $R^1$ is hydrogen, $R^2$ is benzyl, B=N— is 1-piperidyl, and Q is hydrogen.

11. 1 - [1 - ($R^1$) - 2 - Oxo - 2 - (Q-phenyl)ethyl] - 2 - [2 - (B=N—)ethyl]piperidine, wherein $R^1$ is hydrogen or lower-alkyl; B=N— is di-lower alkylamino, 1-piperidyl, 1-pyrrolidyl, 4-morpholinyl, (lower-alkyl)-(phenyl)-amino or (lower - alkyl) - (phenyl - lower - alkyl) - amino; and Q stands for hydogen or from one to three substituents selected from the group consisting of lower-alkyl, lower-alkoxy, halogen and lower-alkylmercapto.

12. 1 - (2 - oxo - 2 - phenylethyl) - 2 - [2-(1-piperidyl)-ethyl]piperidine, according to claim 11, wherein $R^1$ is hydrogen, B=N— is 1-piperidyl, and Q is hydrogen.

References Cited
UNITED STATES PATENTS 3,462,444    8/1969    Beckett et al. _____ 260—294.7J HENRY R. JILES, Primary Examiner S. D. WINTERS, Assistant Examiner U.S. Cl. X.R.

260—247.5, 293.4, 247.1, 293, 348, 618; 424—267

PO-1050
(5/69)

UNITED STATES PATENT OFFICE
CERTIFICATE OF CORRECTION

Patent No. 3,558,639          Dated January 26, 1971

Inventor(s) Frederick K. Kirchner

It is certified that error appears in the above-identified patent and that said Letters Patent are hereby corrected as shown below:

Column 1, line 19, "pipidines" should read --piperidine--

Column 2, line 19, "$N(C_5H_{13})$" should read --$N(C_6H_{13})$--; line 28, "$(C_5H_5CH_2CH_2)$" should read --$(C_6H_5CH_2CH_2)$--.

Column 3, line 35, "formed" should read --form--.

Column 7, line 8, "2-hydroxy-phenyl-" should read --2-hydroxy-2-phenyl- --; line 11, "dl-tartaric" should read --d-tartaric--.

Column 9, line 20, Claim 1, "piperdine" should read --piperidine--.

Column 9, Claim 1, insert between lines 23 and 24: --(lower-alkyl)-(phenyl)amino or--.

Column 10, line 9, Claim 8, "piperdine" should read --piperidine--.

Column 10, line 25, Claim 25, "hydogen" should read --hydrogen--.

Signed and sealed this 17th day of August 1971.

(SEAL)
Attest:

EDWARD M.FLETCHER,JR.
Attesting Officer

WILLIAM E. SCHUYLER,
Commissioner of Pate